United States Patent
Senior et al.

(10) Patent No.: US 9,786,270 B2
(45) Date of Patent: Oct. 10, 2017

(54) GENERATING ACOUSTIC MODELS

(71) Applicant: Google Inc., Mountain View, CA (US)

(72) Inventors: Andrew W. Senior, New York, NY (US); Hasim Sak, New York, NY (US); Kanury Kanishka Rao, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/205,263

(22) Filed: Jul. 8, 2016

(65) Prior Publication Data

US 2017/0011738 A1    Jan. 12, 2017

Related U.S. Application Data

(60) Provisional application No. 62/190,623, filed on Jul. 9, 2015.

(51) Int. Cl.
*G10L 15/06* (2013.01)
*G10L 15/16* (2006.01)
*G10L 15/187* (2013.01)

(52) U.S. Cl.
CPC ........... *G10L 15/063* (2013.01); *G10L 15/16* (2013.01); *G10L 15/187* (2013.01)

(58) Field of Classification Search
CPC .............................. G10L 15/16; G10L 15/063
See application file for complete search history.

(56) References Cited

U.S. PATENT DOCUMENTS

| | | | |
|---|---|---|---|
| 4,799,262 A | 1/1989 | Feldman | |
| 4,868,867 A | 9/1989 | Davidson | |
| 5,150,449 A | 9/1992 | Yoshida et al. | |
| 5,444,488 A | 8/1995 | Goubault | |
| 5,465,318 A | 11/1995 | Sejnoha | |
| 5,509,103 A | 4/1996 | Wang | |
| 5,542,006 A | 7/1996 | Shustorovich et al. | |

(Continued)

FOREIGN PATENT DOCUMENTS

| | | |
|---|---|---|
| EP | 0715298 | 9/2000 |
| EP | 2431969 | 4/2013 |

(Continued)

OTHER PUBLICATIONS

Buciluă, Cristian, Rich Caruana, and Alexandru Niculescu-Mizil. "Model compression." Proceedings of the 12th ACM SIGKDD international conference on Knowledge discovery and data mining. ACM, 2006.*

(Continued)

*Primary Examiner* — Brian Albertalli

(74) *Attorney, Agent, or Firm* — Fish & Richardson P.C.

(57) ABSTRACT

Methods, systems, and apparatus, including computer programs encoded on a computer storage medium, for generating acoustic models. In some implementations, a first neural network trained as an acoustic model using the connectionist temporal classification algorithm is obtained. Output distributions from the first neural network are obtained for an utterance. A second neural network is trained as an acoustic model using the output distributions produced by the first neural network as output targets for the second neural network. An automated speech recognizer configured to use the trained second neural network is provided.

20 Claims, 2 Drawing Sheets

(56) References Cited

U.S. PATENT DOCUMENTS

| | | |
|---|---|---|
| 5,600,753 A | 2/1997 | Iso |
| 5,627,939 A | 5/1997 | Huang |
| 5,680,508 A | 10/1997 | Liu |
| 5,729,656 A | 3/1998 | Nahamo |
| 5,745,872 A | 4/1998 | Sommez |
| 6,038,528 A | 3/2000 | Mammone |
| 6,067,517 A | 5/2000 | Bahl |
| 6,188,982 B1 | 2/2001 | Chiang |
| 6,260,013 B1 | 7/2001 | Sejnoha |
| 6,381,569 B1 | 4/2002 | Sih |
| 6,397,179 B2 | 5/2002 | Crespo et al. |
| 6,434,520 B1 | 8/2002 | Kanevsky |
| 6,631,348 B1 | 10/2003 | Wymore |
| 6,876,966 B1 | 4/2005 | Deng |
| 7,062,442 B2 | 6/2006 | Berg et al. |
| 7,065,487 B2 | 6/2006 | Miyazawa |
| 7,424,426 B2 | 9/2008 | Furui |
| 7,844,466 B2 | 11/2010 | Roy |
| 8,239,195 B2 | 8/2012 | Li |
| 8,340,308 B2 | 12/2012 | Chen |
| 8,442,125 B2 | 5/2013 | Covell |
| 8,463,719 B2 | 6/2013 | Lyon |
| 8,615,397 B2 | 12/2013 | Hart |
| 8,782,012 B2 | 7/2014 | Fusco et al. |
| 8,849,185 B2 | 9/2014 | Cheung et al. |
| 8,965,112 B1 | 2/2015 | Ibarz et al. |
| 9,123,338 B1 | 9/2015 | Sanders |
| 9,263,036 B1 | 2/2016 | Graves |
| 9,299,347 B1 | 3/2016 | Siohan et al. |
| 2001/0001141 A1 | 5/2001 | Sih et al. |
| 2002/0165715 A1 | 11/2002 | Riis |
| 2003/0033143 A1 | 2/2003 | Aronowitz |
| 2003/0088411 A1 | 5/2003 | Ma |
| 2004/0138882 A1 | 7/2004 | Miyazawa |
| 2004/0162722 A1 | 8/2004 | Rex |
| 2004/0181408 A1 | 9/2004 | Acero |
| 2004/0230424 A1 | 11/2004 | Gunawardana |
| 2004/0260546 A1 | 12/2004 | Seo |
| 2006/0053008 A1 | 3/2006 | Droppo |
| 2006/0149558 A1 | 7/2006 | Kahn |
| 2006/0184362 A1 | 8/2006 | Preuss |
| 2006/0195317 A1 | 8/2006 | Graciarena |
| 2007/0088552 A1 | 4/2007 | Olsen |
| 2007/0118373 A1 | 5/2007 | Wise et al. |
| 2008/0300875 A1 | 12/2008 | Yao |
| 2009/0254343 A1 | 10/2009 | Hart |
| 2010/0318354 A1 | 12/2010 | Seltzer |
| 2011/0103614 A1 | 5/2011 | Cheung et al. |
| 2011/0173208 A1 | 7/2011 | Vogel |
| 2011/0238416 A1 | 9/2011 | Seltzer |
| 2011/0307253 A1 | 12/2011 | Lloyd |
| 2012/0004909 A1 | 1/2012 | Beltman |
| 2012/0065976 A1 | 3/2012 | Deng et al. |
| 2012/0143604 A1 | 6/2012 | Singh |
| 2013/0138436 A1 | 5/2013 | Yu et al. |
| 2013/0223645 A1 | 8/2013 | Hetherington |
| 2013/0225128 A1 | 8/2013 | Gomar |
| 2013/0238324 A1 | 9/2013 | Ichikawa |
| 2013/0297299 A1 | 11/2013 | Chakrabartty |
| 2013/0325473 A1 | 12/2013 | Larcher |
| 2013/0343641 A1 | 12/2013 | Mnih et al. |
| 2014/0142929 A1 | 5/2014 | Seide et al. |
| 2014/0156575 A1 | 6/2014 | Sainath et al. |
| 2014/0188487 A1 | 7/2014 | Perez |
| 2014/0257803 A1* | 9/2014 | Yu .................. G06N 3/0481 704/232 |
| 2014/0257804 A1 | 9/2014 | Li et al. |
| 2014/0372112 A1 | 12/2014 | Xue et al. |
| 2015/0066499 A1 | 3/2015 | Wang et al. |
| 2015/0100530 A1 | 4/2015 | Mnih et al. |
| 2015/0127327 A1 | 5/2015 | Bacchiani et al. |
| 2015/0127342 A1 | 5/2015 | Sharifi |
| 2015/0127594 A1 | 5/2015 | Parada San Martin et al. |
| 2015/0340034 A1 | 11/2015 | Schalkwyk et al. |
| 2015/0371633 A1 | 12/2015 | Chelba et al. |
| 2016/0034814 A1* | 2/2016 | Audhkhasi ............... G06N 3/08 706/12 |
| 2016/0093294 A1 | 3/2016 | Kapralova et al. |
| 2016/0171977 A1 | 6/2016 | Siohan et al. |
| 2017/0040016 A1* | 2/2017 | Cui .................. G10L 15/063 |

FOREIGN PATENT DOCUMENTS

| | | |
|---|---|---|
| EP | 2507790 | 1/2014 |
| EP | 2905780 | 8/2015 |
| WO | 02/093934 | 11/2002 |

OTHER PUBLICATIONS

Graves, Alex. "Sequence transduction with recurrent neural networks." arXiv preprint arXiv:1211.3711 (2012).*

Graves et al. "Speech Recognition with Deep Recurrent Neural Networks," arXiv Preprint arXiv 1303.5778v1, Mar. 22, 2013, 5 pages.

"Artificial neural network," From Wikipedia, the free encyclopedia, last modified on Oct. 4, 2015 [retrieved on Oct. 8, 2015]. Retrieved from the Internet: URL<https://en.wikipedia.org/wiki/Artificial_neural_network>, 14 pages.

"Convolutional neural network," From Wikipedia, the free encyclopedia, last modified on Sep. 10, 2015 [retrieved on Oct. 8, 2015]. Retrieved from the Internet: URL<https://en.wikipedia.org/wiki/Convolutional_neural_network>, 9 pages.

"Locality-Sensitivity Hashing," Wikipedia, downloaded from the internet on Jun. 16, 2014, 7 pages , http://en.wikipedia.org/wiki/Locality-sensitive_hashing.

"Long short-term memory," From Wikipedia, the free encyclopedia, last modified on Oct. 5, 2015 [retrieved on Oct. 8, 2015]. Retrieved from the Internet: URL<https://en.wikipedia.org/wiki/Long_short-term_memory>, 4 pages.

"Recurrent neural network," From Wikipedia, the free encyclopedia, last modified on Sep. 30, 2015 [retrieved on Oct. 8, 2015]. Retrieved from the Internet: URL<https://en.wikipedia.org/wiki/Recurrent_neural_network>, 9 pages.

"Speech recognition," From Wikipedia, the free encyclopedia, last modified on Oct. 1, 2015 [retrieved on Oct. 8, 2015]. Retrieved from the Internet: URL<https://en.wikipedia.org/wiki/Speech_recognition>, 16 pages.

"Time delay neural network," From Wikipedia, the free encyclopedia, last modified on Mar. 23, 2015 [retrieved on Oct. 8, 2015]. Retrieved from the Internet: URL<https://en.wikipedia.org/wiki/Time_delay_neural_network>, 1 page.

Aronowitz et al., "New developments in voice biometrics for user Authentication," in Interspeech, Aug. 2011, pp. 17-20.

Aronowitz, "Text-dependent speaker verification using a small development set," in Proc. Odyssey Speaker and Language Recognition Workshop, 2012, 28 pages.

Auckenthaler et al., "Score normalization for text-independent speaker verification systems," Digital Signal Processing, 10: 42-54, 2000.

Bahl et al., "Context Dependent Modeling of Phones in Continuous Speech Using Decision Trees," HLT '91 Proceedings of the workshop on Speech and Natural Language, pp. 264-269, 1991.

Bennani et al., "Connectionist approaches for automatic speaker recognition," in ESCA Workshop on Automatic Speaker Recognition, Identification and Verification, 1990, 265-268.

Bluche et al., "Framewise and CTC Training of Neural Networks for Handwriting Recognition," International Conference on Document Analysis and Recognition—ICDAR, 2015, pp. 81-85.

Brants et al., "Large language models in machine translation," in EMNLP, Jun. 2007, pp. 858-867.

Chou, "Optimal partitioning for classification and regression trees," IEEE Trans. on Pattern Analysis and Machine Intelligence, vol. 13, No. 4, pp. 340-354, Apr. 1991.

Coates and Ng, "The importance of encoding versus training with sparse coding and vector quantization," in Proceedings of the $28^{th}$ International Conference on Machine Learning (ICML-11), Jun. 2011, pp. 921-928.

(56) References Cited

OTHER PUBLICATIONS

Dahl et al "Context-Dependent Pre-Trained Deep Neural Networks for Large-Vocabulary Speech Recognition", IEEE, Trans., ASLP vol. 20 No. 1, Jan. 2012.

Dahl et al., "Improving deep neural networks for LVCSR using rectified linear units and dropout," in Proc. ICASSP, 2013, 5 pages.

Dean et al., "Large Scale Distributed Deep Networks," Proc. Neural Information Processing Systems, pp. 1232-1240, Dec. 2012.

Dehak et al., "Front-end factor analysis for speaker verification," IEEE Transactions on Audio, Speech, and Language Processing, 19: 788-798, 2011.

Deng and Dahl, "Roles of pre-training and fine-tuning in context-dependent DBN-HMMs for real-world speech recognition," in NIPS, 2010, 8 pages.

Donahue et al. "Decaf: A deep convolutional activation feature for generic visual recognition." arXiv preprint arXiv:1310.1531 (2013).

Eyben et al., "From Speech to Letters—Using a Novel Neural Network Architecture for Grapheme Based ASR," Automatic Speech Recognition & Understanding, 2009, ASRU 2009, IEEE Workshop on, pp. 376-380, 2009.

Fernandez et al., "Phoneme recognition in TIMIT with BLSTM-CTC," Technical Report No. IDSIA-04-08, Apr. 2008, 7 pages.

Finan et al., "Comparison of multilayer and radial basis function neural networks for text-dependent speaker recognition," Neural Networks, 1996, IEEE International Conference on. vol. 4. IEEE, 1996, pp. 1992-1997.

Fiscus, "A post-processing system to yield reduced word error rates: Recognizer output voting error reduction (ROVER)," in IEEE Automatic Speech Recognition and Understanding Workshop (ASRU), pp. 347-354, Dec. 1997.

Garimella et al., "Factor analysis of auto-associative neural networks with application in speaker verification," IEEE transactions on neural networks and learning systems 24(4):522-528. Apr. 2013.

Goffin et al., "The AT&T Watson Speech Recognizer," in Proceedings of ICASSP 2005, 4 pages.

Goodfellow et al., "Maxout networks," in Proc. JMLR, 2013, 1319-1327.

Graves et al., "A Novel Connectionist System for Unconstrained Handwriting Recognition," Pattern Analysis and Machine Intelligence, IEEE Transactions on, 31(5):855-868, May 2008.

Graves et al., "Connectionist temporal classification: Labelling unsegmented sequence data with recurrent neural networks," in Proceedings of the $23^{rd}$ International Conference on Machine Learning, ACM, pp. 369-376, Jun. 2006.

Graves et al., "Framewise Phoneme Classification with Bidirectional LSTM and Other Neural Network Architectures," Neural Networks, 18(5):602-610, Aug. 2005.

Graves et al., "Speech Recognition With Deep Recurrent Neural Networks," arXiv:1303.5778v1 [cs.NE], Mar. 2013, 5 pages.

Graves et al., "Towards End-to-End Speech Recognition with Recurrent Neural Networks," Proceedings of the $31^{st}$ International Conference on Machine Learning, vol. 32, pp. 1764-1772, 2014.

Graves, "Supervised Sequence Labelling with Recurrent Neural Networks," Studies in Computational Intelligence, vol. 385, 137 pages, 2012.

Grosz et al., "A Sequence Training Method for Deep Rectifier Neural Networks in Speech Recognition," Speech and Computer. Springer International Publishing, 2014, pp. 81-88.

Hartman, "Training feed-forward neural networks with gain constraints," Neural Computation, 12(4):811-829, Apr. 2000, Abstract only, 1 page.

Hassibi et al., "Second order derivatives for network pruning: Optimal brain surgeon," in Advances in Neural Information Processing Systems 5, 1993, pp. 164-171.

Hermansky et al., "Tandem connectionist feature extraction for conventional HMM systems," in IEEE International Conference on Acoustics, Speech, and Signal Processing (ICASSP), pp. 1635-1638, Jun. 2000.

Hinton et al., "Deep Neural Networks for Acoustic Modeling in Speech Recognition," IEEE Signal Processing Magazine vol. 29, No. 6, 2012.

Hinton et al., "Distilling the Knowledge in a Neural Network," arXiv preprint arXiv:1503.02531, Mar. 2015, 9 pages.

Hinton et al., "Improving neural networks by preventing co-adaptation of feature detectors," in arXive preprint, 2012, 1-18.

Hochreiter and Schmidhuber, "Long short-term memory," Neural Computation, 9(8):1735-1780, Nov. 1997.

Huang et al., "Semi-supervised GMM and DNN acoustic model training with multi-system combination and confidence re-calibration," in Interspeech, Aug. 2013, pp. 2360-2364.

Jaitly et al., "Application of pretrained deep neural networks to large vocabulary speech recognition," in Interspeech, 2012, 4 pages.

Jarrett et al., "What is the best multi-stage architecture for object recognition?" in ICCV. IEEE, 2009, pp. 2146-2153.

Jiang, "Confidence measures for speech recognition: A survey," Speech Communication, vol. 45, No. 4, pp. 455-470, Apr. 2005.

Kenny et al., "A study of interspeaker variability in speaker verification," IEEE Transactions on Audio, Speech, and Language Processing, 16: 980-988, 2008.

Kenny et al., "Joint Factor Analysis versus Eigenchannels in Speaker Recognition," IEEE Transactions on Audio, Speech, and Language Processing, 15: 1435-1447, 2007.

Kenny et al., "Speaker and session variability in GMM-based speaker verification," IEEE Transactions on Audio, Speech, and Language Processing, 15: 1448-1460, 2007.

Kenny, "Bayesian speaker verification with heavy-tailed priors," in Proc. Odyssey Speaker and Language Recognition Workshop, 2010, 10 pages.

Kinnunen et al., "Real-time speaker identification and verification," IEEE Transactions on Audio, Speech and Language Processing, Jan. 1, 2006, 14(1):277-288.

Kuo and Goel, "Active learning with minimum expected error for spoken language understanding," in Interspeech, Sep. 2005, pp. 437-440.

Lamel et al., "Lightly supervised and unsupervised acoustic model training," Computer Speech and Language, vol. 16, No. 1, pp. 115-229, Jan. 2002.

Larcher et al. "Phonetically-constrained PLDA modeling for text-dependent speaker verification with multiple short utterances," in Proc. ICASSP, May 26-31, 2013, 7673-7677.

LeCun et al., "Gradient-based learning applied to document recognition," Proceedings of the IEEE, vol. 86, No. 11, pp. 2278-2324, Nov. 1998.

LeCun et al., "Learning methods for generic object recognition with invariance to pose and lighting," in Computer Vision and Pattern Recognition, 2004. CVPR 2004. Proceedings of the 2004 IEEE Computer Society Conference on, vol. 2. IEEE, Jul. 2004, pp. II-97-II-104.

Lee et al.,"Unsupervised feature learning for audio classification using convolutional deep belief networks," in NIPS, 2009, pp. 1096-1104.

Lei et al., "Application of convolutional neural networks to language identification in noisy conditions," in Proc. Speaker Odyssey Workshop (submitted), 2014, 6 pages.

Liao et al., "Large scale deep neural network acoustic modeling with semi-supervised training data for youtube video transcription," in Workshop on Automatic Speech Recognition and Understanding (ASRU), 2013, 6 pages.

Liao et al., "Large vocabulary automatic speech recognition for children," Interspeech 2015, pp. 1611-1615, Sep. 2015.

Ma and Schwartz, "Unsupervised versus supervised training of acoustic models," in Interspeech, Sep. 2008, pp. 2374-2377.

MathWorks Support Team, "Is it possible to impose constraints on a neural network using Neural Network Toolbox?" MATLAB Answers™, Jun. 27, 2009 [retrieved on Oct. 8, 2015]. Retrieved from the Internet: URL<http://www.mathworks.com/matlabcentral/answers/99132-is-it-possible-to-impose-constraints-on-a-neural-network-using-neural-network-toolbox>, 3 pages.

(56) References Cited

OTHER PUBLICATIONS

McLaren et al., "Application of convolutional neural networks to speaker recognition in noisy conditions," in 15th Annual Conference of the International Speech Communication Association, Sep. 2014, pp. 686-690.
Mohamed et al., "Deep Belief Networks for phone recognition," ICASSP, 2011, pp. 1-9.
Mohri et al., "Weighted Finite-State Transducers in Speech Recognition," Computer Speech and Language, vol. 16, issue 1, pp. 69-88, Jan. 2002.
Morgan et al., "Continuous speech recognition: An introduction to the hybrid HMM/connectionist approach," IEEE Signal Processing Magazine, vol. 12, No. 3, pp. 25-42, 1995.
Nair et al., "Rectified linear units improve restricted Boltzmann machines," in ICML, 2010, 8 pages.
Oglesby et al., "Optimisation of neural models for speaker identification," in Proc. ICASSP, Apr. 3-6, 1990, 1:261-264.
Pennlio, "Fully-connected, locally-connected and shared weights layer in neural networks," Peng's Blog, Apr. 11, 2014 [retrieved on Sep. 8, 2015]. Retrieved from the Internet: URL<https://pennlio.wordpress.com/?s=fully~connected%2C+locally~connected>, 4 pages.
Prabhavalkar et al., "Automatic gain control and multi-style training for robust small-footprint keyword spotting with deep neural networks," Acoustics, Speech and Signal Processing (ICASSP), 2015 IEEE International Conference on, Apr. 2015, pp. 4704-4708.
Ramaswamy, Ganesh N. et al., "Compression of Acoustic Features for Speech Recognition in Network Environments," ICASSP 1998, 4 pages.
Rao et al., "Grapheme-to-Phoneme Conversion Using Long Short-Term Memory Recurrent Neural Networks," Proceedings of ICASSP, 2015, 5 pages.
Reynolds et al., "Speaker Verification Using Adapted Gaussian Mixture Models," Digital Signal Processing 10, 19-41 (2000).
Robinson et al., "A recurrent error propagation network speech recognition system," Computer Speech and Language, 5(3):259-274, Jul. 1991.
Rumelhart et al "Learning representations by back-propagating errors" Nature vol. 323, Oct. 9, 1986, 4 pages.
Rybach et al., "Direct construction of compact context-dependency transducers from data," Computer Speech and Language, vol. 28, issue 1, pp. 177-191, Jan. 2014.
Sainath et al., "Auto-encoder bottleneck features using deep belief networks," in IEEE International Conference on Acoustics, Speech, and Signal Processing (ICASSP), pp. 4153-4156, Mar. 2012.
Sainath et al., "Convolutional, long short-term memory, fully connected deep neural networks," in IEEE International Conference on Acoustics, Speech, and Signal Processing (ICASSP), pp. 4580-4584, Apr. 2015.
Sainath et al., "Deep Convolutional Neural Networks for LVCSR," Acoustics, Speech and Signal Processing (ICASSP), 2013 IEEE International Conference on, pp. 8614-8618, Dec. 2013.
Sak et al., "Fast and accurate recurrent neural network acoustic models for speech recognition," arXiv preprint arXiv:1507.06947, Jul. 2015, 5 pages.
Sak et al., "Language model verbalization for automatic speech recognition," in Acoustics, Speech and Signal Processing (ICASSP), 2013 IEEE International Conference on, IEEE, pp. 8262-8266, May 2013.
Sak et al., "Learning acoustic frame labeling for speech recognition with recurrent neural networks," in IEEE International Conference on Acoustics, Speech, and Signal Processing (ICASSP), pp. 4280-4284, Apr. 2015.
Sak et al., "Long short-term memory recurrent neural network architectures for large scale acoustic modeling," Interspeech 2014, pp. 338-342, Sep. 2014.
Sak et al., "Sequence discriminative distributed training of long short-term memory recurrent neural networks," in Interspeech, 2014, pp. 1209-1213.
Saon et al., "The IBM 2015 English conversational telephone speech recognition system," arXiv preprint arXiv:1505.05899, May 2015, 5 pages.
Schalkwyk et al., ""your word is my command": Google search by voice: A case study," in Advances in Speech Recognition, Springer, Aug. 2010, pp. 61-90.
Senior et al., "Context dependent phone models for LSTM RNN acoustic modelling," in Acoustics, Speech and Signal Processing (ICASSP), 2015 IEEE International Conference on, pp. 4585-4589, Apr. 2015.
Senior et al., "GMM-free DNN acoustic model training," in Acoustics, Speech and Signal Processing (ICASSP), 2014 IEEE International Conference on. IEEE, pp. 5602-5606, Apr. 2014.
Siohan, "Training data selection based on context-dependent state matching," in ICASSP, 2014.
Song et al., "End-to-End Deep Neural Network for Automatic Speech Recognition," Stanford University, CS224d: Deep Learning for Natural Language Processing, 2015 Report, pp. 1-8.
Soong et al., "A Vector Quantization Approach to Speaker Recognition," 1985 IEEE International Conference on Acoustics, Speech, and Signal Processing, vol. 10, Apr. 1985, 387-390.
Stafylakis et al., "Preliminary investigation of Boltzmann machine classifiers for speaker recognition," in Proc. Odyssey Speaker and Language Recognition Workshop, 2012, 8 pages.
Stafylakis et al., "Text-dependent speaker recognition using PLDA with uncertainty propagation," in Proc. Interspeech, 2013, 5 pages.
Tomar et al., "Efficient manifold learning for speech recognition using locality sensitive hashing," Acoustics, Speech and Signal Processing (ICASSP), 2013 IEEE International Conference on. IEEE, 2013, pp. 6995-6999.
Unknown Author, "Unsupervised Feature Learning and Deep Learning Tutorial: Convolutional Neural Network," Stanford University, publically available before Jun. 12, 2015 [retrieved on Sep. 8, 2015]. Retrieved from the Internet: URL<http://ufldl.stanford.edu/tutorial/supervised/ConvolutionalNeuralNetwork/>, 2 pages.
Vanhoucke et al., "Improving the speed of neural networks on CPUs," in Deep Learning and Unsupervised Feature Learning Workshop, NIPS 2011, 2011; pp. 1-8.
Variani et al., "Deep neural networks for small footprint text-dependent speaker verification," in Acoustics, Speech and Signal Processing (ICASSP), 2014 IEEE International Conference on. IEEE, May 2014, pp. 4080-4084.
Vasilakakis et al., "Speaker recognition by means of deep belief networks." (2013). (Published Oct. 2013; Presented on Oct. 14-15, 2013), 7 pages.
Vesely et al., "Sequence-discriminative training of deep neural networks," Interspeech, 2013, pp. 2345-2349.
Williams, Gethin, et al. "Speech/Music Discrimination Based on Posterior Probability Features," Submitted to Eurospeech '99, Budapest, 4 pages.
Wollmer et al., "Probabilistic ASR Feature Extraction Applying Context-Sensitive Connectionist Temporal Classification Networks," Acoustics, Speech and Signal Processing (ICASSP), 2013 IEEE International Conference on, pp. 7125-7129, 2013.
Yegnanarayana et al., "AANN: an alternative to GMM for pattern recognition," Neural Networks, 15(3):459-469, 2002.
Young et al., "Tree-based state tying for high accuracy acoustic modelling," in Proc. ARPA Human Language Technology Workshop, pp. 307-312, Mar. 1994.
Yu et al., "Exploiting Sparseness in Deep Neural Networks for Large Vocabulary Speech Recognition," in ICASSP 2012. IEEE SPS, Mar. 2012, pp. 4409-4412.
Yu et al., "Unsupervised training and directed manual transcription for LVCSR," Speech Communication, vol. 52, No. 7-8, pp. 652-663, Jul. 2010.
Zeiler et al., "On rectified linear units for speech processing," in 38th International Conference on Acoustics, Speech and Signal Processing (ICASSP), 2013.

\* cited by examiner

GENERATING ACOUSTIC MODELS

CROSS-REFERENCE TO RELATED APPLICATION

This application claims the benefit of U.S. Provisional Patent Application No. 62/190,623, filed on Jul. 9, 2015, the entire contents of which is incorporated herein by reference.

BACKGROUND

The present specification relates to generating acoustic models for speech recognition.

Speech recognition systems frequently use one or more models to transcribe speech. For example, an acoustic model may be used to identify which sounds occur in speech. A language model may be used to determine what words or sequences of words are most likely given the sounds identified.

SUMMARY

In some implementations, the training of an acoustic model can involve deriving at least some of the information for the acoustic model from another existing acoustic model. For example, a first neural network can be trained as an acoustic model. Then, a "distillation" technique can be used to transfer the training state or "knowledge" obtained through training of the first neural network to a second neural network. The information may be adjusted through the transfer process to enhance the second neural network. For example, to improve performance the second neural network, the transfer process can involve training the second neural network on noisy audio data, while using output targets based on data generated by the first neural network from clean audio data. In this manner, the second neural network can be trained to account for the presence of noise and provide the desired outputs, e.g., as properly indicated by the first neural network, despite the presence of noise.

The process of transferring information from a first neural network to a second neural network can involve training the second neural network based on a distribution of outputs from the first neural network. For example, rather than training the second neural network to produce a specific labelled target output, the second neural network can be trained to produce a distribution that matches or approximates a distribution produced by the first neural network.

In addition, the process of distillation can be extended to employ sequence constraints. For example, sequence-length constraints can be applied rather than using single frame-wise labelling targets. When imposing constraints on alignment during training, a parameter, such as a "temperature," can be used to "soften" or adjust a probability distribution to preserve information about the confusability distribution of classes.

These techniques can be used for training a model using the connectionist temporal classification (CTC) algorithm. As discussed below, a CTC model can be trained to indicate the presence of various phonetic units or a blank label that does not correspond to any phonetic unit. The CTC model is required to indicate the presence of each phonetic unit of an utterance, in the proper sequence, but the output is not necessarily aligned in time with the corresponding input data. CTC models generally learn alignments during training using the forward-backward algorithm. However, the techniques of the present application can use fixed, stored alignments from a previous model, or alignments computed on-the-fly by a trained model, to give the targets for a new CTC model that is being trained.

Transferring information from one neural network acoustic model to another can involve training where the output-symbol inventories are different for the two models. For example, a first neural network may be trained to generate outputs indicating likelihoods for a first set of phonetic units, e.g., phones, context-independent (CI) states, or context-dependent (CD) states. A second neural network may be trained based on the outputs of the first neural network to generate outputs indicating likelihoods for a second set of phonetic units that is different from the first set used by the first neural network. The second neural network may use more or fewer states than the first neural network. For example, if a CTC neural network is trained based on the output of a non-CTC neural network, the CTC may include an additional output symbol for the "blank" symbol used in CTC.

Additional types of training under changes of output-symbol inventories can be performed. For example, alignments from a context-independent (CI or phone) model can be used, e.g., as "soft targets", optionally with additional softening, to train a model with context-dependent states. The CI label sequence can be mapped to a corresponding series of correct CD states. Alternative outputs may be ambiguous, though there are a number of techniques to assign the probability mass to the larger state inventory. The process can also be used in the opposite direction, e.g., a transfer from a model with a large output symbol inventory to a model with a smaller state inventory. This can be particularly effective when training small models, such as needed to run on a mobile device, from a well-trained large model.

One innovative aspect of the subject matter described in this specification is embodied in methods that include the actions of training a first neural network using the output of a second neural network as targets for the output of the first neural network. The first neural network may be trained with a CTC algorithm, and the output of the first neural network trained with the CTC algorithm may be used as targets for the output of the second neural network that is in training. The first neural network may be trained with the CTC algorithm using clean data as input and the output of that first neural network may be used as targets for training a second neural network using noisy data as input.

Another innovative aspect of the subject matter described in this specification is embodied in methods that include the actions of: obtaining, by one or more computers, a first neural network trained as an acoustic model using connectionist temporal classification; obtaining, by the one or more computers, output distributions from the first neural network for an utterance, the output distributions comprising scores indicating likelihoods corresponding to different phonetic units; training, by the one or more computers, a second neural network as an acoustic model using the output distributions produced by the first neural network as output targets for the second neural network; and providing, by the one or more computers, an automated speech recognizer configured to use the trained second neural network to generate transcriptions for utterances.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

In some implementations, providing an automated speech recognizer comprises: receiving audio data for an utterance; generating a transcription for the audio data using the trained second neural network; and providing the generated transcription for display.

In some implementations, providing an automated speech recognizer comprises providing the trained second neural network to another device for the performance of speech recognition by the other device.

In some implementations, the output distributions from the first neural network for the utterance are obtained using a first set of audio data for the utterance, and the second neural network is trained using a second set of audio data for the utterance, the second set of audio data having increased noise compared to the first set of training data.

In some implementations, training the second neural network as an acoustic model comprises: obtaining audio data for the utterance; adding noise to the audio data for the utterance to generate an altered version of the audio data; generating a sequence of input vectors based on the altered version of the audio data; and training the second neural network using output distributions produced by the first neural network as output targets corresponding to the sequence of input vectors generated based on the altered version of the audio data.

In some implementations, training the second neural network comprises training the second neural network with a loss function that uses two or more different output targets.

In some implementations, training the second neural network using the loss function comprises training the second neural network using a loss function that is a weighted combination of the two or more loss functions.

In some implementations, the weighted combination is a combination of (i) a first loss function that constrains the alignment of inputs and outputs, and (ii) a second loss function that does not constrain the alignment of inputs and outputs.

In some implementations, wherein the two or more loss functions include at least two of a Baum-Welch loss function, a connectionist temporal classification loss function, and a Viterbi alignment loss function.

In some implementations, wherein the second neural network has fewer parameters than the first neural network.

In some implementations, training the second neural network comprises training the second neural network to provide output distributions for the utterance that at least approximate the output distributions from the first neural network for the utterance.

The techniques described herein can provide a number of advantages and improvements. For example, the amount of time required to train a neural network acoustic model can be significantly reduced. In particular, a neural network that is trained based on the output distributions of a CTC-trained neural network can obtain the performance of a CTC network without the time-consuming and resource-intensive process of CTC training. A simpler cross-entropy loss training technique can transfer the knowledge learned by one neural network to another, allowing the trained neural network to quickly reach a high level of accuracy.

Additionally, the disclosed techniques are able to transfer information learned by one neural network to another neural network, despite differences in the topologies of the neural networks. For example, the two networks may include differing input or output layers, or different numbers and types of hidden layers. As an example, a large extensively trained neural network can provide output distributions used to train a much smaller neural network. This can allow the smaller neural network to replicate or closely approximate the accuracy of the larger network, but with significantly reduced size and processing requirements and with increased processing speed. This technique can be used to convert a large model to a smaller, more efficient model that can run locally at a phone or other user device.

In addition, the process of transferring knowledge from one neural network to another can be used to enhance robustness of an acoustic model when dealing with noise. For example, a first neural network can provide output distributions, generated from clean audio information, to provide highly accurate training targets. The second neural network being trained, however, can receive inputs that describe the same utterance but also include artificially added noise. The second neural network can learn to provide the "clean" output distributions in response to the "noisy" input data, which can lead to better accuracy than if either network were originally trained with conventional training on the noisy input data.

The details of one or more embodiments of the invention are set forth in the accompanying drawings and the description below. Other features and advantages of the invention will become apparent from the description and the drawings.

BRIEF DESCRIPTION OF THE DRAWINGS

Like reference numbers and designations in the various drawings indicate like elements.

DETAILED DESCRIPTION

Figure 1:
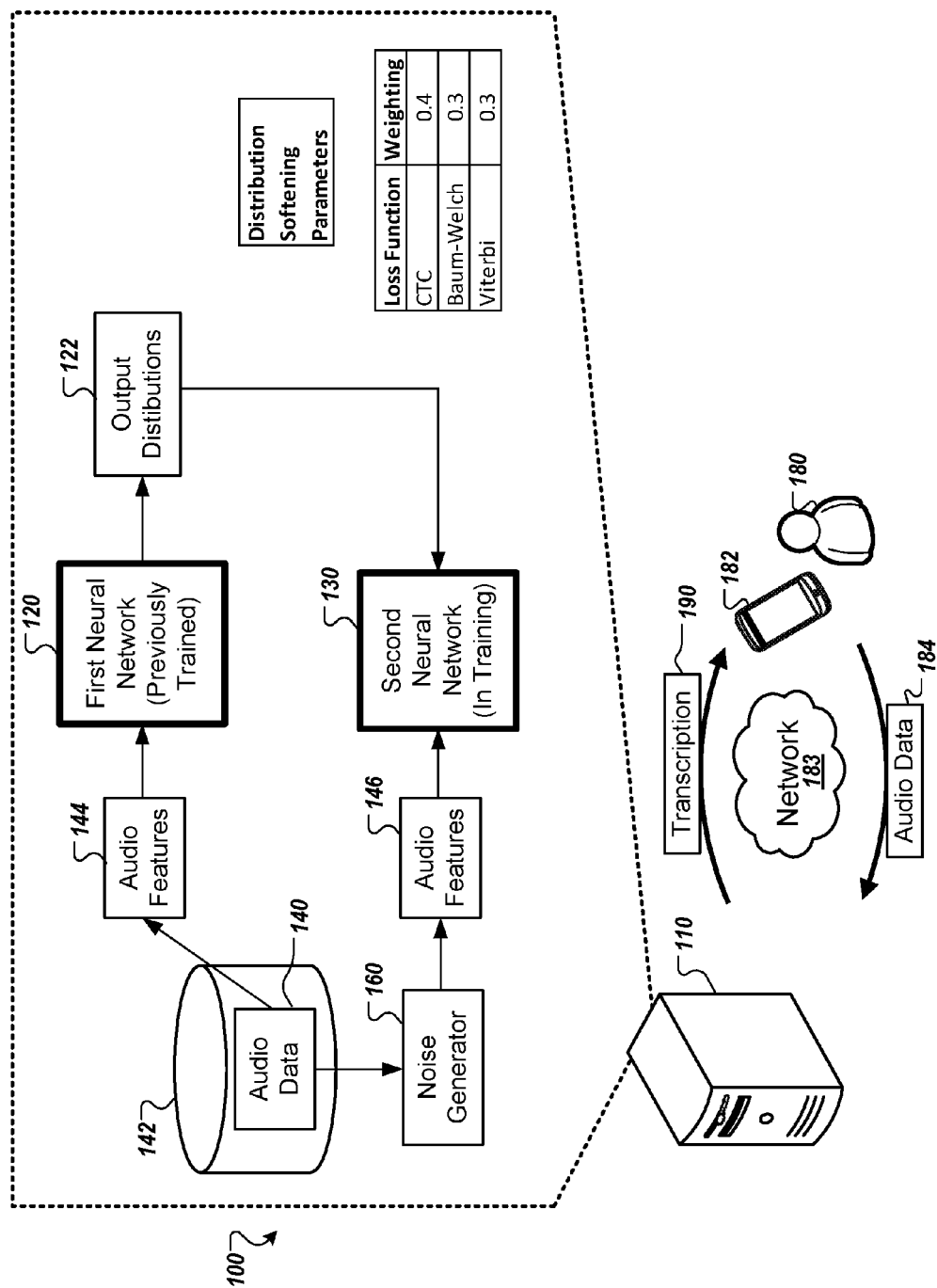
FIG. 1 is a diagram that illustrates an example of a system for generating acoustic models.

FIG. 1 is a diagram that illustrates an example of a system 100 for generating acoustic models. The system includes a computing system 110 that includes one or more computers. The computing system 110 uses a first neural network 120, which has been trained as an acoustic model, to train a second neural network 130 as an acoustic model. The first neural network 120, the second neural network 130, or both may be trained using a CTC algorithm. The operations performed by the system 100 may be performed in the sequence shown or in another sequence.

To improve the performance of the second neural network 130 for inputs that include noise, the second neural network 130 can receive input data that includes noise, while the first neural network produces outputs from "clean" input data that does not include the noise. The second neural network 130 can then be trained to produce, in response to noisy input, outputs that match or approximate the outputs generated by the first neural network 120 in response to the clean audio data.

One of the benefits of transferring information from the first neural network 120 to the second neural network 130 is the ability to replicate or approximate the performance of a large, complex model with a much smaller model. The first neural network 120 can be comprehensively trained using a large network, without size or processing constraints, to achieve very high accuracy. As an example, the first neural network 120 may represent a collection of many neural networks each trained somewhat differently. The collection can be used as an ensemble of classifiers, e.g., 50 different neural networks, and the average of the output distributions of the networks can be used to represent the output of the first neural network. However, in some instances, the large model may run too slowly, or have size and processing requirements that are beyond the capabilities of the target platform, such as a phone or embedded device.

Unlike many DNN, HMM, and GMM acoustic models, CTC models learn how to align phones and with audio data and are not limited to a specific forced alignment. With CTC, there is generally no time alignment supervision since the network is constantly integrating over all possible alignments. This means that recurrent or LSTM layers can vary the delay between acoustics and outputs, using an arbitrarily large future context if that helps optimizing the total sequence probability.

Through the recurrent properties of the neural network, the neural network may accumulate and use information about future context to classify an acoustic frame. The neural network is generally permitted to accumulate a variable amount of future context before indicating the phone that a frame represents. Typically, when connectionist temporal classification (CTC) is used, the neural network can use an arbitrarily large future context to make a classification decision.

The use of a "blank" output label is also a typical characteristic of CTC. Rather than attempting to identify a phone for every frame, a CTC model is allowed to provide a "blank" or "don't know" output. Each phone in a sequence is indicated for only one frame, and so the majority of frames are labeled with the "blank" label. The output labels that indicate phone occurrence are constrained to occur in the sequence that the phones occur in the utterance, with arbitrary amounts of blank labels allowed in between phone labels.

In some implementations, the first neural network is trained using individual ground truth targets. For example, a particular frame of input may be an "a" phone, and so the corresponding output target would assign the entire probability distribution, e.g., a 100% likelihood, to a single "a" phone label as the correct label for the sound. This output target may be represented as an output vector that is a one-hot vector, with a value of 1 for the "a" phone label, and zero values indicating zero likelihood for the other labels.

Although the first neural network is trained using output targets that indicate specific single labels, during the training process overall the first neural network learns relationships among various phones, including which phones may sound confusingly similar at times. The output of the first neural network 120 for a particular frame may distribute the probability for an output among multiple different output labels. For example, while the first neural network 120 may assign a highest likelihood to the "a" phone label that is the correct phone, e.g., a likelihood of 80%, the output may also indicate at least some likelihood for additional labels that are not correct for the current input, e.g., a 10% likelihood of an "e" phone label, a 5% likelihood of a "y" phone label, and so on. The probabilities for the additional phone labels, while incorrect for the current input, still provide information learned by the first neural network 120 through its training. The first network, through the confusion or degree of uncertainty between the different labels, is encoding additional information about the similarity of the classes. This represents implicit knowledge about relationships between different output classes. Through the training process described herein, this implicit knowledge and the general proficiency of the first neural network 120 can be transferred efficiently to the second neural network 130.

In further detail, the computing system 110 obtains a first neural network 120 which has been previously trained as an acoustic model. The training state of the first neural network 120 serves as the source of output target information for training the second neural network 130. For example, the first neural network 120 has been trained to provide output values indicative of the likelihoods that different phones have been observed in input data. The output of the first neural network 120 may be a vector of output values, where each output value is a probability score indicating the likelihood for a different output label. The output vector has a dimension that equals the total number of output labels that can be predicted. This output vector encodes a probability distribution, indicating the allocation of probability among the various output labels. The first neural network 120 can be trained, using the CTC algorithm, to indicate CI phone labels. For such a model, if the language has 44 different phones, the number of output labels may be 45, e.g., one label for each phone and another "blank" label used in CTC. The first neural network 120 can alternatively be trained to predict other phonetic units, such as CD phones, CI states of phones, CD states of phones, and so on. The first neural network 120 may be a deep neural network (DNN), a recurrent neural network (RNN), a network including long short-term memory (LSTM) layers, a convolutional neural network (CNN), or a network combining features of several neural network types, such as a convolutional LSTM DNN (CLDNN). Additionally, the first neural network 120 may represent multiple neural networks, such as an ensemble of classifiers each having their own training state, whose outputs are averaged or otherwise aggregated.

The computing system 110 also obtains a second neural network 130 to be trained. The second neural network 130 may be a deep neural network (DNN), a recurrent neural network (RNN), a network including long short-term memory (LSTM) layers, a convolutional neural network (CNN), or a combination thereof, such as a convolutional LSTM DNN (CLDNN). In many instances, the second neural network 130 has a different network structure than the first neural network 120. For example, the second neural network 130 may be smaller than the first neural network 120, having many fewer parameters, e.g., weights for neurons, or connections between neurons. For example, compared to the first neural network 120, the second neural network 130 may have one half the parameters or less, or one quarter the parameters or less, and so on. In some implementations, the second neural network 130 may have the same or similar structure to the first neural network 120.

In some implementations, the second neural network 130 is trained to produce CTC-type outputs, e.g., output vectors indicating probability distributions for a set of output labels including a "blank" symbol, and where phone indications are in sequence but not strictly time-aligned with input data. However, the second neural network 130 can be trained to produce these outputs without using the CTC sequence training technique. Instead, the second neural network 130 can be trained directly to match or approximate the CTC output distributions produced by the first neural network 120.

The computing system 110 accesses a set of audio data 140 from one or more data storage devices 142. The audio data 140 can include audio waveform data for various utterances, each referred to as a training utterance. These utterances can include utterances of different words and phrases, by different speakers. Each training utterance is one example that can be used to update the parameters of the model.

The computing system 110 uses the audio data 140 to generate audio features 144 as input to the first neural network 120, which generates output distributions 122 used as training targets for the second neural network 130. The computing system 110 also uses the audio data 140 to generate audio features 146 inputs to the second neural network 130 for use in the training For example, for a particular training utterance in the audio data 140, the computing system 110 divides the audio for the utterance into a series of frames representing a particular window or subset of the utterance. For example, 25 millisecond (ms) windows of the utterance can be used, and a new window can begin ever 10 ms, allowing for overlap between adjacent windows. For each frame or window, a set of acoustic features can be determined, for example, 80-dimensional log-mel filterbank energies. The features for multiple frames can be stacked to generate a stacked frame that includes context of nearby frames. Due to the overlap in frames and the overlap in context, the stacked frames may be downsam pled by a factor of 3 (i.e. one stacked-frame every 30 ms, with 65 ms of overlap). The resulting stacked frames form a sequence of input vectors that are provided to the first neural network 120 to represent the particular training utterance.

For the same particular training utterance, the computing system 110 also generates a sequence of input vectors that are provided to the second neural network 130. The input vectors to the second neural network 130, illustrated as audio features 146, can be generated using the same technique used to generate the input vectors to the first neural network 120. In some instances, the input vectors to the first neural network 120 and the second neural network 130 are the same. However, in other instances, such as the example of FIG. 1, the input vectors to the two neural networks 120, 130 are different.

The system 100 of FIG. 1 includes a noise generator 160 that adds noise to the audio data 140, so that the audio features 146 are generated based on a noisy or degraded version. As used herein, "noise" refers to any degradation of an audio signal, such as reverberation, echo, distortion, additive noise, and so on. The noise generator 160 may include an environment simulator that produces noise corresponding to different rooms or places, and different noisy versions of a single training utterance can be generated for each "clean" training utterance. Because the noise is added to the audio recording, there is a clear one-to-one correspondence between the clean audio and the noisy audio, and both versions have the same alignment in time.

After adding noise to a training utterance, the computing system 110 generates a sequence of input vectors or stacked frames from the noisy version of the training utterance. The input vectors for the second neural network 130 represent the same utterance content and same time window as the corresponding input vectors to the first neural network 120, but the content of the vectors will often be different due to the presence of added noise. The input vectors for the second neural network 130 may also be different for other reasons. For example, the second neural network 130 may include a different sized input layer compared to the first neural network 120, and so may accept a different number of input values. As another example, the second neural network 130 may process a different set or type of acoustic features than the first neural network 120, and so the same frame or portion of an utterance may be represented by a different type of acoustic feature for each network.

The computing system 110 then trains the second neural network using the output distributions 122 from the first neural network 120 as the target outputs of the second neural network 130. For this training iteration, the output distributions 122 and the input audio features 146 correspond to the same training utterance, although the input audio features 146 reflect added noise that was not used to generate the output distributions. The second neural network 130 is effectively trained with the goal of matching the outputs of the first neural network 120 for the same utterance. Because the audio features 146 to the second neural network 130 include additional noise, the second neural network 130 can learn to produce the appropriate output distributions even when noise characteristics are reflected in the input audio features 146. The use of input data to the first neural network 120 based on clean audio data allows the second neural network 130 to learn accurate output distributions 122, which can be produced by the first neural network 120 which is trained for high accuracy using low-noise inputs. This technique of matching outputs from clean audio with inputs from noisy audio can produce better results than simply training the second neural network 130 using noisy audio. Noise may introduce ambiguity in the CTC algorithm, and thus may decrease the quality of a model trained with CTC under noisy data. Since the second neural network 130 can match the output distributions 122 without using the CTC algorithm, the high quality of the output distributions 122 is maintained while the second neural network 130 learns to produce those distributions despite the presence of noise.

In some implementations, multiple iterations of training can be done for the second neural network 130 for a single training utterance, but with different versions of noise. Each of the noisy versions can be used to generate a sequence of input vectors, and the same sequence of output distributions 122 for the utterance can be used as the training targets for different sequences of input vectors representing different noise environments.

The training process can continue for many different training utterances, with the internal parameters of the second neural network 130 being adjusted during each iteration. While the second neural network 130 is trained to provide CTC-type output distributions, the second neural network 130 is not necessarily trained using the CTC algorithm to determine appropriate alignments or outputs. Instead, for each frame of an utterance, the second neural network 130 can be trained with the goal of matching the output distribution 122 that the first neural network 120 produced for the same frame of the same utterance. For example, cross-entropy training can be used to align the outputs of the second neural network 130 with the output distributions 122 of the first neural network 120. With this technique, training can proceed much more quickly than with the CTC algorithm. Additionally, because the second neural network 130 learns the characteristics of the first neural network 120 which is often larger and includes more parameters, the accuracy of the resulting second neural network 130 can be greater than if the second neural network 130 were trained alone.

In some implementations, the second neural network 130 can be trained using multiple output targets. For example, apart from the output distributions provided by the first neural network 120, the CTC algorithm can be used on the second neural network 130, to determine another set of output targets. In this case, a transcription of the utterance can be accessed, and a phonetic representation for the transcription can be used to determine the output CTC output targets. The two sets of output targets, the output distributions 122 and those from CTC, can be used together to train the second neural network 130. The second neural network 130 may be trained using both output targets, and the second neural network 130 will learn an output that is between the two targets.

In some implementations, the loss functions for multiple alignment techniques or output targets can be combined in a weighted combination used as the loss function for training. Besides the generated output distributions 122 and CTC algorithm, other types of loss functions may be used, alone or together, including algorithms for Baum-Welch alignment and Viterbi alignment. The computing system 110 can use a weighted combination of two or more of these loss functions as a loss function while updating the parameters of the second neural network 130. The computing system 110 can store and access weighting values that indicate relative weight of different alignment techniques in affecting the loss function and ultimately the impact of each technique on the training of the second neural network 130.

In general, output targets generated using the CTC algorithm on the first neural network 120, or output targets generated using the CTC algorithm for the second neural network 130, limit the potential outputs to the output target labels in the transcription for the utterance. For example, for an utterance of "cat," only "c," "a," and "t" sounds would be valid outputs for the sequence. An individual frame, however, considered in isolation from the sequence, may appear to be more like an "x" sound or another sound. Since a recurrent first neural network 120 uses information about context of the sequence, the output targets for a frame may be different when the frame is provided in isolation or as part of a sequence. To more completely transfer the information in the first neural network 120 to the second neural network 130, it may be beneficial to train the models using outputs for individual frames, apart from the sequence in which they occur. The training of the second neural network 130 can be performed with or without temporal constraints. For example, training can occur for isolated frames of an utterance individually, or with sequence constraints that require certain relationships within a sequence of frames. A blend of both training techniques can also be used.

In some implementations, the output distributions 122 produced by the first neural network 120 can be adjusted prior to use as output targets for the second neural network 130. For example, some output distributions may indicate an extremely high confidence of one output target, such as a 99% likelihood or higher for a particular output label. Such an unbalanced distribution may be undesirable for training, since it approaches a binary decision rather than a distribution that encodes non-zero likelihoods for multiple output labels. However, the probabilities can be exponentiated and normalized to generate a less-extreme distribution that allocates a greater share of the probability to other labels. For example, each of the probability values, e.g., 0.9999, 0.00001, and so on, can each be raised to an exponent for a base of ten, e.g., 10^0.9999, 10^0.00001, and so on, and the resulting quantities can be normalized into a probability distribution. This softened probability distribution can be used as the output target for the second neural network 130 rather than the direct output of the first neural network 120. This can bring out the patterns embedded in the original distribution, with values of, e.g., 0.75, 0.1, 0.05, and so on, rather than a sharp distribution that is closer to a binary value and zeros for the rest of the values. In some implementations, this process is performed in conjunction with softmax outputs of the first neural network 120. Softmax output nodes may include a linear combination as well as exponentiation and/or normalization, and so the softening of the output distribution may be integrated in the softmax output calculations.

Referring still to FIG. 1, after the second neural network 130 is trained, the computing system 110 provides access to an automated speech recognizer that uses the second neural network 130 to transcribe speech. For example, the computing system 110 or another server system may receive audio data 184 over a network 183 from a user device 182 of a user 180, then use the trained second neural network 130 along with a language model and other speech recognition techniques to provide a transcription 190 of the user's utterance to the user device 182, where can be displayed, provided to an application or otherwise used. As another example, the second neural network 130 can be provided to the user device 182, and the user device 182 can perform speech recognition using the trained second neural network 130.

An automatic speech recognition system may use neural network acoustic models to estimate probabilities which are aggregated in a hidden Markov model "decoder". In some instances, recurrent neural networks (RNNs), and in particular deep Long Short Term Memory (LSTM) RNNs, may outperform deep neural networks (DNNs). Also, in some instances, greater accuracy may be obtained with acoustic models with a "blank" symbol that are trained using the connectionist temporal classification (CTC) algorithm followed by sequence discriminative training, and using context dependent (CD) whole-phone models.

The techniques discussed herein include various extensions and refinements to CTC models, including improvements to CD phone CTC models. In general, CTC models may be trained with CD phone output labels and a "blank" symbol. The models may be initially trained using the CTC algorithm to constantly realign with the Baum-Welch algorithm and train using a cross-entropy loss. Models may then be further trained sequence-discriminatively using the Segmental Minimum Bayes-Risk (SMBR) loss.

One example model has 5 LSTM layers of 600 cells, each with its own gates. The output distribution is 9288 context-dependent phone set plus a "blank" symbol, and the inputs are gain 80-dimensional log-mel filterbank energies computed on a 25 ms window every 10 ms, stacked 8-deep and downsampled by a factor of 3 (i.e., one stacked-frame every 30 ms, with 65 ms of overlap). The model can be used in a streaming or continuous speech recognition system, where the automated speech recognizer provides transcription information as the user continues to speak.

Example training data may include large numbers of utterances, e.g., hundreds of thousands to a million or more utterances, which can be anonymized utterances of live traffic, e.g., voice searches. These may be corrupted using a room simulator which adds artificial noise (e.g., non-speech audio) and reverberation.

In English, there are many homographs—words with alternative pronunciations for a given written form. When starting from a written transcription and training a spoken-form model, which spoken form to use may be chosen. The training may apply Viterbi alignment to a lattice containing alternative pronunciations and allow the model to choose. CTC models may be trained using a unique alignment string, which may be derived from an alignment with a DNN model. The forward-backward algorithm may be applied to the full CD phone lattice and may jointly train a CTC model and choose the alternative pronunciation.

A particular deep network architecture may combine convolutional layers followed by LSTM layers followed by fully connected layers and finishing with a soft-max layer. This convolution layer plus LSTM plus DNN (CLDNN) model shows improved results compared to deep LSTM architectures. Further, a similar CLDNN architecture trained with CTC leads to improved performance compared to a deep LSTM CTC network.

Multiple classifiers may be combined together to create a joint classifier which performs better than any of the original classifiers. This combination may be formed with a weighted combination of the classifiers' posteriors in score fusion. In speech recognition, simple score combination techniques may be used, for example, combining 3 conventional LSTM classifiers trained under the same conditions but for randomization (of both weight initialization and data-shuffling) provides a relative reduction in word error rate (WER).

The recognizer output voting error reduction (ROVER) technique may be used to combine the output hypotheses of speech recognition systems, particularly when the systems have been developed independently, so share no intermediate representation (such as the CD state inventory) where score fusion could be carried out. The ROVER technique may implement a voting strategy across systems to combine alternative hypotheses for time segments. Alternatively, score and confidence measures may be used for N-best lists or lattices.

Since CTC networks with 30 ms features use so little computation for acoustic model computation and search, model combination is an attractive option. In particular, further gains may be achieved by combining three models, while still being no slower than a conventional LSTM acoustic model.

The ROVER technique is applicable to CTC networks as well, and may even be used to combine CTC and other systems (e.g., DNN, LSTM, CLDNN), for example, decoding separately with each of the candidate networks, and using ROVER to combine the hypotheses. However, ROVER may require decoding to be carried out for each network, in addition to computing acoustic model scores for each network, which is all that is required for score combination.

While diverse CTC systems may be trained to estimate CD phone posteriors in a shared output space, the timing of the output symbols with CTC is arbitrary and the timing of the spikes is different for different networks. Simple score fusion may not be as desirable with CTC, since combining output posteriors by weighted averaging may lead to meaningless scores where the strong signals from one network counteract the strong-but-differently-timed signals from another network. However, this may be mitigated with temporal pooling or using CTC-delay constraints.

Alternatively, a speech recognition technique of taking two independently-trained networks and combining their final softmax layers by averaging together the contributions from each of the sub-networks may be utilized. With further retraining to either cross-entropy or sequence-discriminative criteria, the joint network may be rebalanced to give performance superior to any of the component networks.

This technique may overcome the timing issues of score combination, since the joint retraining may force the networks to synchronize, while still only requiring a single decoding for the combination.

In training hybrid neural network systems for speech recognition, the network may be trained with a cross-entropy loss with respect to fixed targets, which are determined by forced-alignment of a set of acoustic frames with a written transcript, transformed into the phonetic domain. Forced-alignment may find the maximum-likelihood label sequence for the acoustic frames and give labels for every frame either in {0, 1} for Viterbi alignment or in [0, 1] for Baum-Welch alignment.

For Gaussian Mixture Models (GMMs), the Expectation-Maximization (EM) algorithm may be used to iteratively improve a model by using it to align the data ("E step") and then optimizing the parameters ("M step"). With DNNs, where every utterance is used in each of many epochs of training, a fixed alignment may be stored from a previous "best" model and used through many epochs of stochastic gradient descent, while continuous realignment is also feasible.

Embodiments of the present disclosure may use a variety of alternative alignment strategies in conjunction with the CTC algorithm. In the CTC algorithm, the current model may be used to compute a target alignment in the form of the posteriors of the alignment (equivalent to the Baum-Welch alignment). These targets may be used for a cross-entropy training, but are recomputed with the latest model throughout training. An acoustic model may be trained to match fixed alignments computed with a previous "best" CTC model.

Alternatively, in the process of "distillation", it is possible to train a model to match the output distribution of an existing model. The new model is able to learn the "dark knowledge" stored in the original model and encoded in the distribution of outputs for a given input. In other words, where a Viterbi target would treat one label as correct and all others as incorrect, the output distribution of a trained network encodes the confusability between classes. Thus, as an alternative to training a network to match the targets computed by the Baum-Welch algorithm on its own outputs or those of another network, a network may be trained to match the output distribution of a network directly. The Baum-Welch algorithm employs the temporal constraints, but the "distillation" procedure transfers the "dark knowledge" from one network to another. Of course, all three methods of computing the targets may be employed, and a weighted combination of the three losses may be optimized. With the additional hyperparameter of the "temperature" of distillation, the option of using an alignment cross-entropy loss from a separate output layer to improve stability and speed of convergence causes the space of loss-functions to become large, even without variation over time or considering their interaction with sequence-discriminative training.

An existing network, pre-trained on noisy data, may be used to generate targets for a second network being initially trained. Targets may be either taken directly from the first network's outputs, with no softening, or by applying the CTC algorithm to the first networks' outputs. Transferring the targets directly with either method performs about equally well, but may not achieve the same performance as training directly with the CTC algorithm. Similarly, training a new network on noisy data using the targets of the network trained on aligned clean data may not perform as well as training directly with CTC on noisy data, though the performance may be recovered by further CTC retraining on noisy data.

In exemplary embodiments of the present disclosure, a neural network may be trained by classifying frames, for example, through forced alignment using an optimal boundary of distinct phones in an inputted sequence of phones to generate respective labels of the phones. A first neural network may be a large network trained for many phones or may be an ensemble of trained networks. When an utterance is input to the first neural network, one or more candidate phones may be output with a corresponding probability or confidence value associated with each of the output phones. These outputs of the first network may be used as targets to train a second network.

In some embodiments, a first neural network may be trained using the CTC algorithm. The CTC algorithm allows the neural network to output a blank or "don't know" label rather than forcing a probability or confidence value to be output for every frame; but forces the network to output at least one frame with a label. Thus, the first neural network may be trained to match target phones, and may thereby output one frame for each phone through iterations of training. The outputs from the first neural network trained in this manner using the CTC algorithm may be used as targets for the output of a second neural network in the training of the second neural network. In other words, the second network may be trained to match the output of the first neural network that has been trained using the CTC algorithm.

In some embodiments, a first neural network may be trained using audio signals or data as input that contain no noise or very little noise—so-called "clean data". Noise may then be artificially added to the clean data and input to the neural network so that the neural network learns to separate the noise. In embodiments of the present disclosure, a first neural network may be trained as described above (e.g., through forced alignment or using the CTC algorithm) with clean data as input. The output of this first neural network may be used as targets to train a second neural network. The second neural network may be trained by inputting data that contains a significant amount of noise—so-called "noise data"—with the targets used as output of the second neural network taken from the output of the first neural network that was trained with clean data. In addition, the output of the first neural network may be "softened" using the distillation process described above. For example, the probability or confidence value associated with each of the output phones may be exponentiated to normalize the probability distribution among the outputs. This distillation, using a "temperature" to "soften" the probability distribution serves to preserve information about the confusability distribution between classes.

Figure 2:
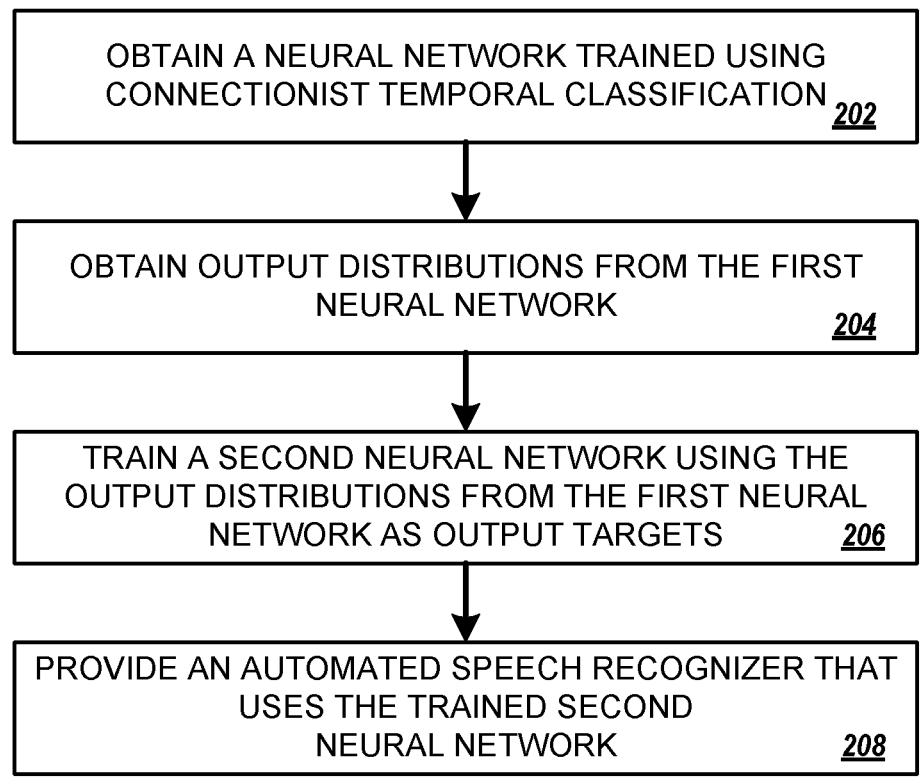
FIG. 2 is a flow diagram that illustrates an example of a process for generating acoustic models.

FIG. 2 is a flow diagram that illustrates an example of a process 200 for generating an acoustic model. The process 200 can be performed by one or more computers, which may be distributed across multiple locations.

A first neural network trained using connectionist temporal classification is obtained (202). The first neural network can be trained as an acoustic model, e.g., to provide output that indicates a distribution of probabilities among a set of output target labels. These output labels can include a "blank" symbol that does not correspond to a phonetic unit. Other output labels can be CI phones, CD phones, CI HMM states for phones, CD HMM states for phones, and other phonetic units.

Output distributions are obtained from the first neural network for an utterance (204). The output distributions can include scores indicating likelihoods corresponding to different phonetic units.

A second neural network can be trained as an acoustic model using the output distributions produced by the first neural network as output targets for the second neural network (206). In some implementations, the second neural network has fewer parameters than the first neural network. The second neural network can be trained with the goal of matching the output distributions generated by the first neural network 120. For example, the second neural network can be trained to provide output distributions for the utterance that at least approximate the output distributions from the first neural network for the utterance.

An automated speech recognizer, configured to use the trained second neural network to generate transcriptions for utterances, is provided (208). This can involve providing access to a server-based automated speech recognizer. For example, a server system can receive audio data for an utterance, generate a transcription for the audio data using the trained second neural network, and provide the generated transcription for display. Providing the automated speech recognizer can involve providing the trained second neural network to another device for the performance of speech recognition by the other device. For example, the second neural network may be provided to a user device, such as a laptop computer, desktop computer, phone, smart phone, wearable computer (e.g., watch, necklace, bracelet, etc.), GPS navigation system, in-vehicle processing system, appliance, home automation system, etc.

The inputs used during training of the second neural network can include inputs based on a version of an utterance for which noise has been added. For example, the output distributions from the first neural network for the utterance can be obtained using a first set of audio data for the utterance. The second neural network can be trained using a second set of audio data for the utterance, where the second set of audio data has increased noise compared to the first set of training data. Training the second neural network as an acoustic model can include obtaining audio data for the utterance, adding noise to the audio data for the utterance to generate an altered version of the audio data, and generating a sequence of input vectors based on the altered version of the audio data. The second neural network can then be trained using output distributions produced by the first neural network as output targets corresponding to the sequence of input vectors generated based on the altered version of the audio data.

In some implementations the second neural network is trained with a loss function that uses two or more different output targets. For example, the loss function can be a weighted combination of the two or more loss functions. The weighted combination can be a combination of (i) a first loss function that constrains the alignment of inputs and outputs, and (ii) a second loss function that does not constrain the alignment of inputs and outputs. As an example, the two or more loss functions can include at least two of a Baum-Welch loss function, a connectionist temporal classification loss function, and a Viterbi alignment loss function.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the disclosure. For example, the steps recited can be performed in a different order and still achieve desirable results.

What is claimed is:

1. A method performed by one or more computers, the method comprising:
   obtaining, by the one or more computers, a first neural network trained as an acoustic model using connectionist temporal classification;
   obtaining, by the one or more computers, output distributions from the first neural network for an utterance, the output distributions comprising scores indicating likelihoods corresponding to different phonetic units;
   training, by the one or more computers, a second neural network as an acoustic model using the output distributions produced by the first neural network as output targets for the second neural network; and
   providing, by the one or more computers, an automated speech recognizer configured to use the trained second neural network to generate transcriptions for utterances.

2. The method of claim 1, wherein providing an automated speech recognizer comprises:
   receiving audio data for an utterance;
   generating a transcription for the audio data using the trained second neural network; and
   providing the generated transcription for display.

3. The method of claim 1, wherein providing an automated speech recognizer comprises providing the trained second neural network to another device for the performance of speech recognition by the other device.

4. The method of claim 1, wherein the output distributions from the first neural network for the utterance are obtained using a first set of audio data for the utterance, and the second neural network is trained using a second set of audio data for the utterance, the second set of audio data having increased noise compared to the first set of training data.

5. The method of claim 1, wherein training the second neural network as an acoustic model comprises:
   obtaining audio data for the utterance;
   adding noise to the audio data for the utterance to generate an altered version of the audio data;
   generating a sequence of input vectors based on the altered version of the audio data; and
   training the second neural network using output distributions produced by the first neural network as output targets corresponding to the sequence of input vectors generated based on the altered version of the audio data.

6. The method of claim 1, wherein training the second neural network comprises training the second neural network with a loss function that uses two or more different output targets.

7. The method of claim 6, wherein training the second neural network using the loss function comprises training the second neural network using a loss function that is a weighted combination of the two or more loss functions.

8. The method of claim 7, wherein the weighted combination is a combination of (i) a first loss function that constrains the alignment of inputs and outputs, and (ii) a second loss function that does not constrain the alignment of inputs and outputs.

9. The method of claim 7, wherein the two or more loss functions include at least two of a Baum-Welch loss function, a connectionist temporal classification loss function, and a Viterbi alignment loss function.

10. The method of claim 1, wherein the second neural network has fewer parameters than the first neural network.

11. The method of claim 1, wherein training the second neural network comprises training the second neural network to provide output distributions for the utterance that at least approximate the output distributions from the first neural network for the utterance.

12. A system comprising:
   one or more computers and one or more storage devices storing instructions that are operable, when executed by the one or more computers, to cause the one or more computers to perform operations comprising:
      obtaining, by the one or more computers, a first neural network trained as an acoustic model using connectionist temporal classification;
      obtaining, by the one or more computers, output distributions from the first neural network for an utterance, the output distributions comprising scores indicating likelihoods corresponding to different phonetic units;
      training, by the one or more computers, a second neural network as an acoustic model using the output distributions produced by the first neural network as output targets for the second neural network; and
      providing, by the one or more computers, an automated speech recognizer configured to use the trained second neural network to generate transcriptions for utterances.

13. The system of claim 12, wherein providing an automated speech recognizer comprises:
   receiving audio data for an utterance;
   generating a transcription for the audio data using the trained second neural network; and
   providing the generated transcription for display.

14. The system of claim 12, wherein providing an automated speech recognizer comprises providing the trained second neural network to another device for the performance of speech recognition by the other device.

15. The system of claim 12, wherein the output distributions from the first neural network for the utterance are obtained using a first set of audio data for the utterance, and the second neural network is trained using a second set of audio data for the utterance, the second set of audio data having increased noise compared to the first set of audio data.

16. The system of claim 12, wherein training the second neural network as an acoustic model comprises:
   obtaining audio data for the utterance;
   adding noise to the audio data for the utterance to generate an altered version of the audio data;
   generating a sequence of input vectors based on the altered version of the audio data; and
   training the second neural network using output distributions produced by the first neural network as output targets corresponding to the sequence of input vectors generated based on the altered version of the audio data.

17. One or more non-transitory computer-readable storage media storing with a computer program, the program comprising instructions that when executed by one or more computers cause the one or more computers to perform operations comprising:
   obtaining, by the one or more computers, a first neural network trained as an acoustic model using connectionist temporal classification;

obtaining, by the one or more computers, output distributions from the first neural network for an utterance, the output distributions comprising scores indicating likelihoods corresponding to different phonetic units;

training, by the one or more computers, a second neural network as an acoustic model using the output distributions produced by the first neural network as output targets for the second neural network; and providing, by the one or more computers, an automated speech recognizer configured to use the trained second neural network to generate transcriptions for utterances.

18. The one or more non-transitory computer-readable storage media of claim 17, wherein providing an automated speech recognizer comprises:

receiving audio data for an utterance;

generating a transcription for the audio data using the trained second neural network; and providing the generated transcription for display.

19. The one or more non-transitory computer-readable storage media of claim 17, wherein providing an automated speech recognizer comprises providing the trained second neural network to another device for the performance of speech recognition by the other device.

20. The one or more non-transitory computer-readable storage media of claim 17, wherein the output distributions from the first neural network for the utterance are obtained using a first set of audio data for the utterance, and the second neural network is trained using a second set of audio data for the utterance, the second set of audio data having increased noise compared to the first set of audio data.

* * * * *